US008611233B2

(12) United States Patent
Davis et al.

(10) Patent No.: US 8,611,233 B2
(45) Date of Patent: Dec. 17, 2013

(54) SYSTEM AND METHOD FOR TESTING NETWORK ELEMENTS USING A TRAFFIC GENERATOR WITH INTEGRATED SIMPLE NETWORK MANAGEMENT PROTOCOL (SNMP) CAPABILITIES

(75) Inventors: Adam M. Davis, Berryville, VA (US); Syed A. Ahmad, Ashburn, VA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 214 days.

(21) Appl. No.: 12/365,426

(22) Filed: Feb. 4, 2009

(65) Prior Publication Data

US 2010/0195509 A1     Aug. 5, 2010

(51) Int. Cl.
*H04L 12/26* (2006.01)
*H04L 12/28* (2006.01)
*G06F 15/173* (2006.01)

(52) U.S. Cl.
USPC ........... 370/250; 370/241; 370/248; 370/252; 370/254; 709/224

(58) Field of Classification Search
USPC ................. 370/241, 248–249, 250, 252, 254; 709/224–225
See application file for complete search history.

(56) References Cited

U.S. PATENT DOCUMENTS

| | | | | |
|---|---|---|---|---|
| 5,477,531 A * | 12/1995 | McKee et al. | ................. | 370/249 |
| 6,069,873 A * | 5/2000 | Pugaczewski et al. | ....... | 370/241 |
| 6,269,330 B1 * | 7/2001 | Cidon et al. | .................... | 714/43 |
| 6,922,395 B1 * | 7/2005 | Elliott et al. | .................. | 370/241 |
| 6,958,977 B1 * | 10/2005 | Mitrani et al. | ................ | 370/252 |
| 7,385,931 B2 * | 6/2008 | Magnaghi et al. | ........... | 370/248 |
| 7,483,390 B2 * | 1/2009 | Rover et al. | .................... | 370/254 |
| 7,631,227 B2 * | 12/2009 | Poisson et al. | .................. | 714/43 |
| 7,688,741 B2 * | 3/2010 | Botton-Dascal et al. | ..... | 370/241 |
| 7,739,346 B1 * | 6/2010 | Goldschlager | ................ | 709/207 |
| 8,169,920 B2 * | 5/2012 | Nanjundaswamy et al. | . | 370/242 |
| 2003/0053419 A1 * | 3/2003 | Kanazawa et al. | ........... | 370/252 |
| 2005/0025061 A1 * | 2/2005 | Pedersen et al. | ............. | 370/249 |
| 2005/0235058 A1 * | 10/2005 | Rackus et al. | ................ | 709/224 |
| 2007/0076605 A1 * | 4/2007 | Cidon et al. | .................... | 370/230 |
| 2007/0115833 A1 * | 5/2007 | Pepper et al. | ................. | 370/241 |
| 2008/0031153 A1 * | 2/2008 | Punreddy et al. | ............. | 370/252 |
| 2008/0049623 A1 * | 2/2008 | Qiu et al. | ....................... | 370/241 |
| 2008/0137540 A1 * | 6/2008 | Botvich | ......................... | 370/241 |
| 2008/0201468 A1 * | 8/2008 | Titus | ............................... | 709/224 |
| 2009/0003225 A1 * | 1/2009 | Klassen et al. | ................ | 370/250 |
| 2009/0116395 A1 * | 5/2009 | Sasaki et al. | .................. | 370/245 |
| 2010/0049781 A1 * | 2/2010 | Keeni | ............................. | 709/202 |

\* cited by examiner

*Primary Examiner* — Candal Elpenord

(57) ABSTRACT

A system and method in accordance with exemplary embodiments may receive, from a management system, configuration data associated with a management protocol. In addition, the system and method may generate test data traffic at least based on the configuration data. Further, the system and method may transmit, to one or more network elements, the test data traffic. Even further, the system and method may receive, from the management system, a query associated with the management protocol that requests data traffic information associated with at least one of the generated test data traffic, transmitted test data traffic, and received test data traffic. The system and method may transmit, to the management system, the requested data traffic information in response to the query.

19 Claims, 5 Drawing Sheets

Data Traffic Information Graphical User Interface

400

Traffic Generator Data Traffic Information

Total Data Packets Generated: 702 Kb

Total Data Packets Transmitted: 690 Kb

Free Memory: 690 Kb

FIGURE 4

SYSTEM AND METHOD FOR TESTING NETWORK ELEMENTS USING A TRAFFIC GENERATOR WITH INTEGRATED SIMPLE NETWORK MANAGEMENT PROTOCOL (SNMP) CAPABILITIES

BACKGROUND INFORMATION

Many engineers tasked with testing network elements in a test environment may be proficient in a plurality of programming languages used to communicate with the different types of network elements being tested. Becoming proficient in the plurality of programming languages, however, may decrease testing productivity for large amounts of time. Accordingly, these engineers may desire a more efficient way of communicating with the various network elements in the test environment.

Further, a traditional traffic generator may not be configured to respond to queries from one or more management systems in a test environment. Accordingly, engineers may desire a way to successfully communicate with one or more traffic generators.

BRIEF DESCRIPTION OF THE DRAWINGS

Purposes and advantages of the exemplary embodiments will be apparent to those of ordinary skill in the art from the following detailed description in conjunction with the appended drawings in which like reference characters are used to indicate like elements, and in which:

FIG. 4 illustrates an exemplary screen shot of a graphical user interface for data traffic information in accordance with exemplary embodiments.

These and other embodiments and advantages will become apparent from the following detailed description, taken in conjunction with the accompanying drawings, illustrating by way of example the principles of the various exemplary embodiments.

DETAILED DESCRIPTION OF EXEMPLARY EMBODIMENTS

The description below describes network elements, traffic generators, and management systems that may include one or more modules, some of which are explicitly shown in the figures, others that are not. As used herein, the term "module" may be understood to refer to computing software, firmware, hardware, and/or various combinations thereof. It is noted that the modules are exemplary. The modules may be combined, integrated, separated, and/or duplicated to support various applications. Also, a function described herein as being performed at a particular module may be performed at one or more other modules and/or by one or more other devices instead of or in addition to the function performed at the particular module. Further, the modules may be implemented across multiple devices and/or other components local or remote to one another. Additionally, the modules may be moved from one device and added to another device, and/or may be included in both devices.

The description below also describes physical and logical elements of a system, some of which are explicitly shown in figures, others that are not. The inclusion of some physical elements of a system may help illustrate how a given system may be modeled. It should be noted, however, that all illustrations are purely exemplary and that the network management system described herein may be performed on different varieties of systems which may include different physical and logical elements.

Figure 1:
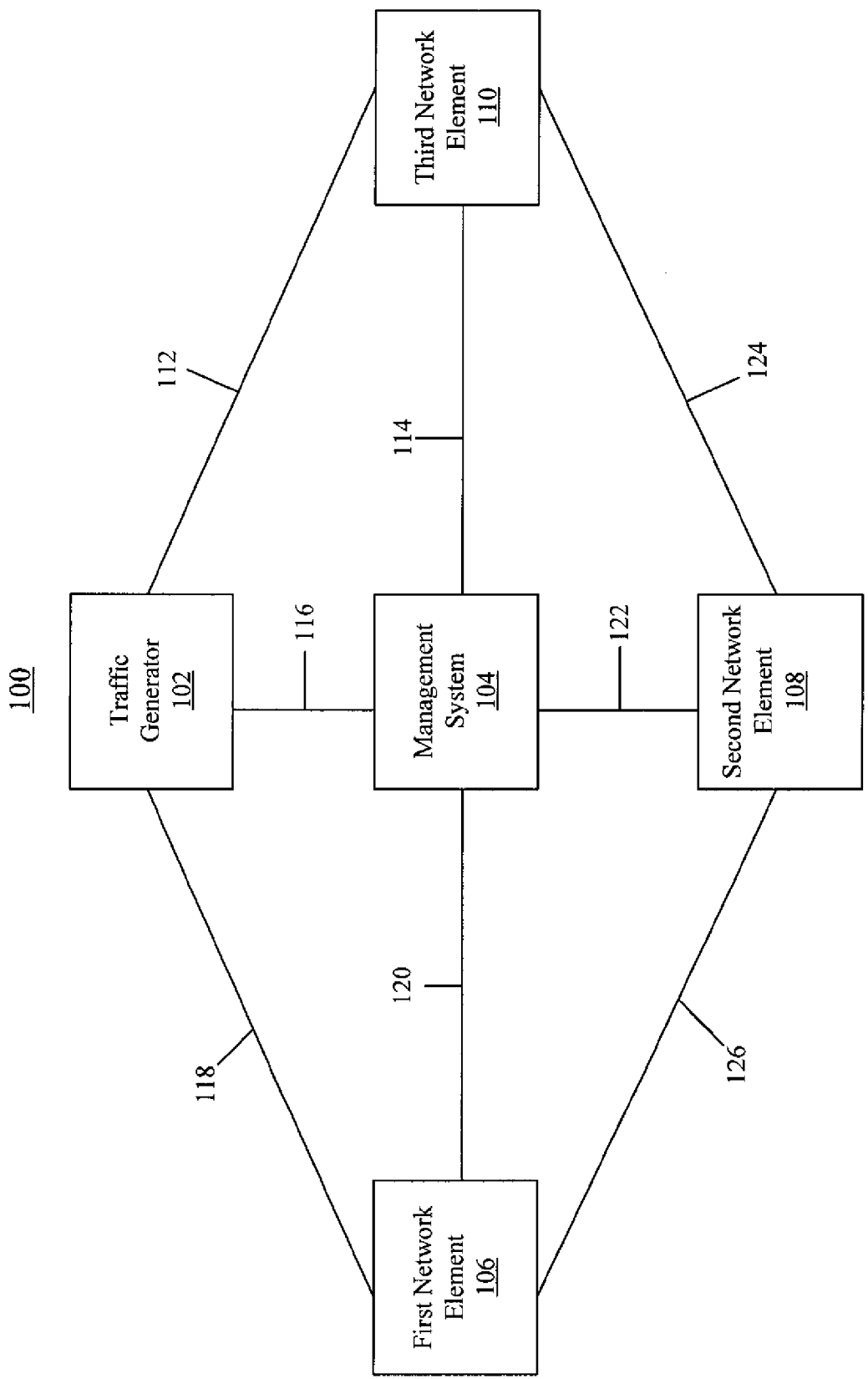
FIG. 1 illustrates a block diagram of a network management system in accordance with exemplary embodiments.

For instance, network management system 100 from FIG. 1 illustrates a simplified view of a system and various elements in the system. It is noted that other hardware and software not depicted may be included in the network management system 100. It is also noted that the network management system 100 illustrates a specific number of instances of a traffic generator 102, a management system 104, a first network element 108, a second network element 106, and a third network element 110. It will be appreciated that a single instance and/or multiple instances of these entities may be included in a network management system 100.

It is further noted that the software described herein may be tangibly embodied in one or more physical media, such as, but not limited to, a compact disc (CD), a digital versatile disc (DVD), a floppy disk, a hard drive, read only memory (ROM), random access memory (RAM), as well as other physical media capable of storing software, and/or combinations thereof. Moreover, the figures illustrate various components (e.g., network elements, traffic generators, and management systems) separately. The functions described as being performed at various components may be performed at other components, and the various components may be combined and/or separated. Other modifications also may be made.

It should be noted that configuring a traffic generator to operate with SNMP capabilities may decrease the amount of time spent by engineers learning new programming languages since many network appliances (other than the traffic generator) are configured with SNMP capabilities.

In an exemplary embodiment, a network management system may be configured to test one or more network appliances associated with the network management system using one or more SNMP test functions to monitor the one or more network appliances. In various embodiments, the network management system may monitor the one or more network appliances to determine whether the one or more network appliances are in a condition that warrants administrative attention (e.g., a latched up condition). In various embodiments, a traffic generator associated with the network management system may be configured with one or more SNMP capabilities. For example, a traffic generator may include an SNMP agent (e.g., SNMP software) configured to collect, store, analyze, and/or report data traffic information associated with the traffic generator. Data traffic information may include one or more data traffic statistics associated with one or more data traffic variables (e.g., the amount of data packets generated, the amount of data packets transmitted, the amount of data packets received, the amount of time taken for one or more data packets to travel from the traffic generator back to the traffic generator, the amount of error data packets received by the traffic generator, amount of free memory, system name, amount of running processes, the default route). Accordingly, the traffic generator may be configured to respond to one or more SNMP queries from a management system communicatively coupled to the traffic generator. A SNMP query may include a request for data traffic information associated with the targeted network appliance in accordance with the SNMP procedures.

In an exemplary embodiment, a traffic generator, a management system, and/or one or more network elements of a network management system may be communicatively coupled to each other such that data traffic generated and/or transmitted from the traffic generator may be received by the one or more network elements. For example, a first network element may be communicatively coupled to the traffic generator such that the first network element receives data traffic generated by the traffic generator and transmits the data traffic to one or more other network elements. In another example, a second network element may be communicatively coupled to the traffic generator such that the second network element receives data traffic generated by the traffic generator and transmits the data traffic to one or more other network elements. In yet another example, a third network element may be communicatively coupled to the traffic generator such that the third network element receives data traffic generated by the traffic generator and transmits the data traffic to one or more other network elements.

In an exemplary embodiment, a traffic generator and/or one or more network elements may be communicatively coupled to a management system such that the traffic generator and/or the one or more network elements may receive one or more SNMP queries from the management system and/or transmit one or more responses to the one or more SNMP queries to the management system.

FIG. 1 illustrates a block diagram of a network management system 100 in accordance with exemplary embodiments. The network management system 100 may include one or more network elements that are configured to perform one or more network management tasks using SNMP capabilities. For example, the network management system 100 may include one or more network elements that are managed (e.g., managed systems) and one or more network elements that manage (e.g., management systems). In various embodiments, the one or more managed systems of the network management system 100 may perform the one or more network management tasks using a SNMP agent that resides on the managed system. In various embodiments, the one or more management systems of the network management system 100 may perform the one or more network management tasks using a SNMP console that resides on the management system. In an exemplary embodiment, a network element may include one or more routers, one or more switches, and/or any other device that may be used to forward data along a data path in a network.

As shown in FIG. 1, the managed systems of the network management system 100 may include a traffic generator 102, a first network element 106, a second network element 108, and/or a third network element 110. The management systems of the network management system 100 may include a management system 104.

As illustrated in FIG. 1, the traffic generator 102 may be communicatively coupled to the first network element 106 via data path 118, the management system 104 via data path 116, and the third network element 110 via data path 112. The first network element 106 may be communicatively coupled to the management system 104 via data path 120 and the second network element 108 via data path 126. The third network element 110 may be communicatively coupled to the management system 104 via data path 114 and the second network element 108 via data path 124. The second network element 108 may be communicatively coupled to the management system 104 via data path 122. Accordingly, data traffic originating from the traffic generator 102 may be configured to flow from the traffic generator 102 to the first network element 106 via data path 118, the management system 104 via data path 116, and/or the third network element 110 via data path 112 to reach other network elements of the network management system 100. As used herein, the phrase "data traffic" may be used to refer to one or more data packets, one or more datagrams, one or more frames, one or more messages, one or more segments, and/or any other logical information that is conveyed via a network.

In an exemplary embodiment, the traffic generator 102 may include, but is not limited to, a computer device or communications device including, e.g., a personal computer (PC), a workstation, a thin system, a fat system, a network appliance, a server, a lap top device, a router, a switch, a network element, and/or any other device that is configured to generate and/or transmit data traffic to one or more network elements, receive data traffic from one or more network elements, receive one or more SNMP queries from the management system 104, and/or output data traffic information in response to the one or more SNMP queries.

In an exemplary embodiment, the traffic generator 102 may be configured to generate data traffic and/or transmit data traffic to one or more other network elements of the network management system 100. For example, the traffic generator 102 may be configured to generate data traffic to simulate "real" data traffic within a test environment (e.g., test data traffic). In an exemplary embodiment, the traffic generator 102 may be configured to collect, store, analyze, and/or report data traffic information associated with the traffic generator using a SNMP agent. In an exemplary embodiment, the traffic generator 102 may be configured to respond to one or more SNMP queries from the management system 104 by providing the data traffic information to the management system 104. For example, a SNMP query from the management system 104 may request data traffic information that indicates the amount of time for a particular data packet to travel from a first port of the traffic generator 102 to a second port of the traffic generator 102. In another example, a SNMP query from the management system 104 may request data traffic information that indicates the amount of error data packets received by the traffic generator 102. In yet another example, a SNMP query from the management system 104 may request data traffic information that indicates the amount of data packets received by the traffic generator 102. Accordingly, the traffic generator 102 may be configured to respond to the one or more SNMP queries from the management system 104 by providing the requested data traffic information. It should be noted that traffic generator 102 may be configured to provide data traffic information that contains one or more statistics associated with data traffic (e.g., delay time statistics, travel time statistics, error packets statistics, downtime statistics) in response to a SNMP query from the management system 104. Accordingly, traffic generator 102 may be configured to provide any data traffic information, such as data traffic information that is provided by an analyzer (e.g., network analyzer) that is well-known in the art.

In an exemplary embodiment, the SNMP agent of the traffic generator 102 may be configured to receive configuration data (e.g., test configuration data) from the management system 104 and/or apply the configuration data to one or more configuration variables. Configuration data may include data that indicates the value of one or more configuration variables as determined by a user of the network management system 100. For example, configuration data may include data that indicates that a proper response to a first logical instance of a test (e.g., Test 1) is to reply with the name of that test (e.g., a "Test 1" reply). A configuration variable may include one or more variables that may be configured by a user (e.g., a test name, a response-to-a-test, a system name, a default route). A test name configuration variable may include data that may be set and/or configured to indicate a test name (e.g., "Test 1"). A response-to-a-test configuration variable may include data that may be set and/or configured to indicate a particular response to a particular test. A system name configuration variable may include data that may be set and/or configured to indicate a system name. A default route configuration variable may include data that may be set and/or configured to indicate a default route.

In an exemplary embodiment, the management system 104 may include, but is not limited to, a computer device or communications device including, e.g., a personal computer (PC), a workstation, a thin system, a fat system, a network appliance, an Internet browser, a server, a lap top device, and/or any other device that is configured to generate and/or transmit one or more SNMP queries, receive data traffic information in response to the one or more SNMP queries, and/or output the data traffic information to one or more users of the network management system 100.

In an exemplary embodiment, the management system 104 may be configured to manage the traffic generator 102, the first network element 106, the second network element 108, and/or the third network element 110 (e.g., the managed systems or network elements of the network management system 100) using the SNMP console that resides on the management system 104. For example, the management system 104 may be configured to generate one or more SNMP queries and/or transmit one or more SNMP queries to the traffic generator 102, the first network element 106, the second network element 108, and/or the third network element 110 to monitor these devices. In an exemplary embodiment, the management system 104 may be configured to receive data traffic information from the traffic generator 102, the first network element 106, the second network element 108, and/or the third network element 110 in response to one or more SNMP queries. In an exemplary embodiment, the management system 104 may be configured to output (e.g., display and/or report) the data traffic information to one or more users of the network management system 100 using an output mechanism (e.g., a display device, an output report).

In an exemplary embodiment, the first network element 106, the second network element 108, and/or the third network element 110 may be configured to receive data traffic from one or more network elements of the network management system 100 and/or transmit data traffic to one or more network elements of the network management system 100. In an exemplary embodiment, the first network element 106, the second network element 108, and/or the third network element 110 may be configured to receive one or more SNMP queries from the management system 104 and/or respond to the one or more SNMP queries by transmitting the requested data traffic information to the management system 104. The traffic generator 102 and the management system 104 are discussed in further detail below.

Figure 2:
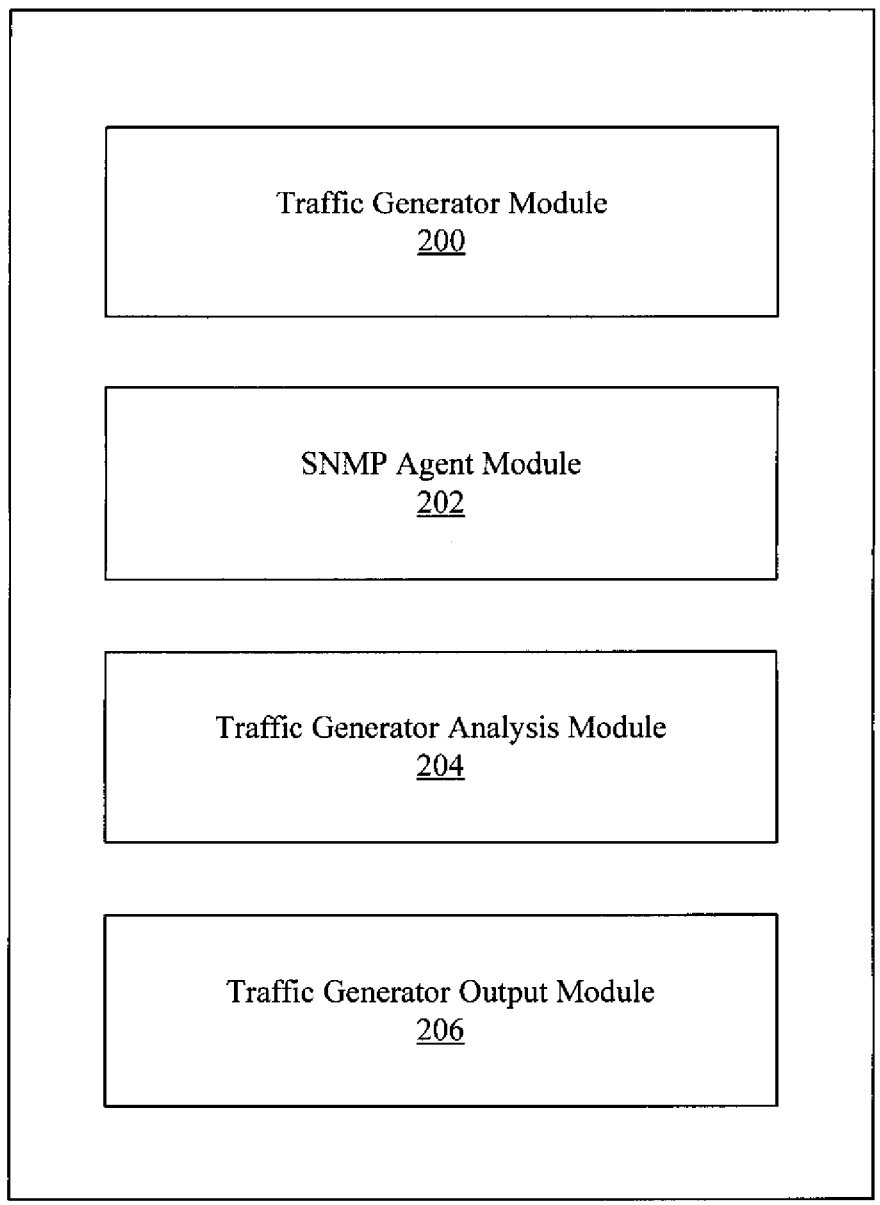
FIG. 2 illustrates exemplary modules of a traffic generator of a network management system in accordance with exemplary embodiments.

FIG. 2 illustrates exemplary modules of a traffic generator 102 of a network management system 100 in accordance with exemplary embodiments. In an exemplary embodiment, the traffic generator 102 may include a traffic generator module 200, a SNMP agent module 202, a traffic generator analysis module 204, and a traffic generator output module 206. It is noted that the modules 200, 202, 204, and 206 are exemplary. The functions of the modules 200, 202, 204, and 206 may be performed at other modules remote or local to the traffic generator 102, and the modules 200, 202, 204, and 206 may be combined and/or separated.

The traffic generator module 200 may include software and/or hardware configured to generate data traffic. In various embodiments, the traffic generator module 200 may be configured to generate data traffic that simulates "real" data traffic in a test environment. For example, the traffic generator module 200 may generate data traffic that simulates "real" data traffic associated with a passive optical network (PON), a cable network, and/or any other network that transmits data traffic to one or more network appliances.

The SNMP agent module 202 may include software and/or hardware configured to receive configuration data from the management system 102. In various embodiments, the SNMP agent module 202 may be configured to apply the configuration data to one or more configuration variables such that a user of the network management system 100 is enabled to set the value of one or more configuration variables associated with the traffic generator 102. For example, the SNMP agent module 202 may apply configuration data that indicates that the default route of the traffic generator 102 has been changed from a first default route (e.g., transmit generated data packets to the third network element 110) to a second default route (e.g., transmit generated data packets to the first network element 108). In various embodiments, configuration data may be transmitted to and/or received by the SNMP agent module 202 when changes are made to the infrastructure of the network management system 100.

The SNMP agent module 202 may include software and/or hardware configured to receive data traffic from one or more network appliances of the network management system 100. In various embodiments, the SNMP agent module 202 may be configured to receive data traffic from the first network element 108, the second network element 106, and/or the third network element 110.

The SNMP agent module 202 may include software and/or hardware configured to analyze the received data traffic to formulate data traffic information. In various embodiments, the SNMP agent module 202 may be configured to formulate data traffic information that indicates the value of one or more data traffic variables. For example, the SNMP agent module 202 may analyze generated data traffic that indicates that the traffic generator 102 generated fifty-seven (57) Megabytes (Mb) of data traffic. In another example, the SNMP agent module 202 may analyze received data traffic that indicates that the traffic generator 102 received two (2) Kilobytes (Kb) of error data packets. In yet another example, the SNMP agent module 202 may analyze the time in which ten (10) data packets were transmitted from a first port (e.g., port 1) (not shown) of the traffic generator 102 and the time in which the ten (10) data packets were received at a second port (e.g., port 2) (not shown) of the traffic generator 102 that indicates the total travel time of the ten (10) data packets.

The SNMP agent module 202 may include software and/or hardware configured to receive one or more SNMP queries from a management system 104. For example, the SNMP agent module 202 may be configured to receive a first SNMP query from the management system 104 that requests data traffic information that indicates the amount of time taken for a particular data packet to travel from a first port of the traffic generator 102 to a second port of the traffic generator 102. In another example, the SNMP agent module 202 may be configured to receive a second SNMP query from the management system 104 that requests data traffic information that indicates the amount of error data packets received by the traffic generator 102. In yet another example, the SNMP agent module 202 may be configured to receive a third SNMP query from the management system 104 that requests data traffic information that indicates the amount of data packets received by the traffic generator 102.

The SNMP agent module 202 may include software and/or hardware configured to process the one or more SNMP queries by accessing the requested data traffic information. In various embodiments, the SNMP agent module 202 may be configured process the one or more SNMP queries received from the management system 104 by accessing the value of the data traffic variables associated with the requested data traffic information (e.g., the amount of data packets generated variable, the amount of data packets transmitted variable, the amount of data packets received variable, the amount of time taken for one or more data packets to travel from the traffic generator back to the traffic generator variable, the amount of error data packets received by the traffic generator variable, the amount of free memory variable, the system name variable, the amount of running processes variable, the default route variable).

The traffic generator analysis module 204 may include software and/or hardware configured to receive data traffic. In various embodiments, the traffic generator analysis module 204 may receive data traffic that is transmitted by the traffic generator output module 206. In various embodiments, the traffic generator analysis module 204 may receive data traffic at one or more ports associated with the traffic generator 102.

In response to the one or more SNMP queries received from the management system 104, the traffic generator output module 206 may be configured to output (e.g., transmit) the data traffic information requested to the management system 104. In an exemplary embodiment, the traffic generator output module 206 may be configured to output the data traffic generated by the traffic generator module 200 to one or more network appliances of the network management system 100.

Figure 3:
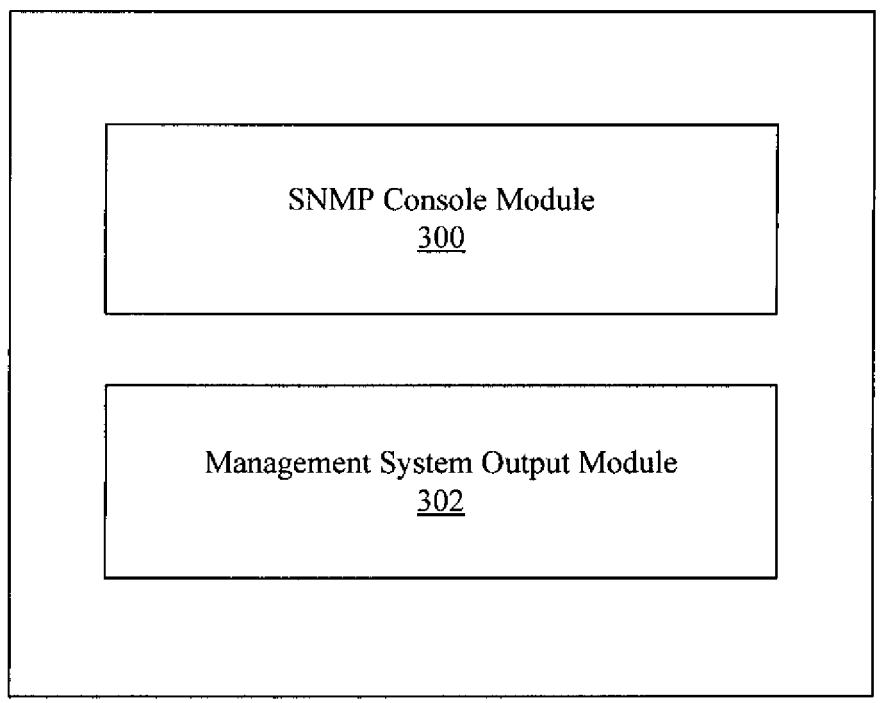
FIG. 3 illustrates exemplary modules of a management system of a network management system in accordance with exemplary embodiments.

FIG. 3 illustrates exemplary modules of a management system 104 of a network management system 100 in accordance with exemplary embodiments. In an exemplary embodiment, the management system 104 may include a SNMP console module 300 and a management system output module 302. It is noted that the modules 300 and 302 are exemplary. The functions of the modules 300 and 302 may be performed at other modules remote or local to the management system 104, and the modules 300 and 302 may be combined and/or separated.

The SNMP console module 300 may include software and/or hardware configured to manage one or more network appliances of the network management system 100. In various embodiments, the SNMP console module 300 may be configured to manage the traffic generator 102, the first network element 106, the second network element 108, and/or the third network element 110 by applying a management protocol (e.g., the SNMP management protocol). Accordingly, the SNMP console module 300 may be configured to generate and/or transmit configuration data to the traffic generator 102, the first network element 106, the second network element 108, and/or the third network element 110 based on input from a user of the network management system 100.

In an exemplary embodiment, the SNMP console module 300 may be configured to monitor the traffic generator 102, the first network element 106, the second network element 108, and/or the third network element 110 by generating one or more SNMP queries and/or transmitting one or more SNMP queries to the traffic generator 102, the first network element 106, the second network element 108, and/or the third network element 110. In response to the transmission of the one or more SNMP queries, the SNMP console module 300 may be configured to receive data traffic information from the traffic generator 102, the first network element 106, the second network element 108, and/or the third network element 110.

The management system output module 302 may include software and/or hardware configured to output (e.g., display and/or report) data traffic information to a user of the network management system 100. In various embodiments, the management system output module 302 may output data traffic information to a user by displaying the data traffic information to the user through a graphical user interface operating on a display device (e.g., a monitor) associated with the management system 104, such as the graphical user interface 400 for data traffic information illustrated in FIG. 4. In various embodiments, the management system output module 302 may output data traffic information to a user by generating and outputting a data traffic information report to the user.

FIG. 4 illustrates an exemplary screen shot of a graphical user interface 400 for data traffic information in accordance with exemplary embodiments. In an exemplary embodiment, the graphical user interface 400 may be arranged as depicted in FIG. 4. The graphical user interface 400 may display to a user data traffic information received from the traffic generator 102, the first network element 106, the second network element 108, the third network element 110, and/or any other network element associated with the network management system 100.

For example, the graphical user interface 400 may display data traffic information received from the traffic generator 102. The data traffic information displayed may include the amount of data packets generated by the traffic generator (e.g., 702 Kb), the amount of data packets transmitted by the traffic generator 102 (e.g., 690 Kb), and/or the amount of free memory on the traffic generator 102 (e.g., 2 Mb). The user reviewing this data traffic information may request additional data traffic information, modify one or more configuration variables, and/or perform any other task to aid in managing the managed systems of the network management system 100.

Figure 5:
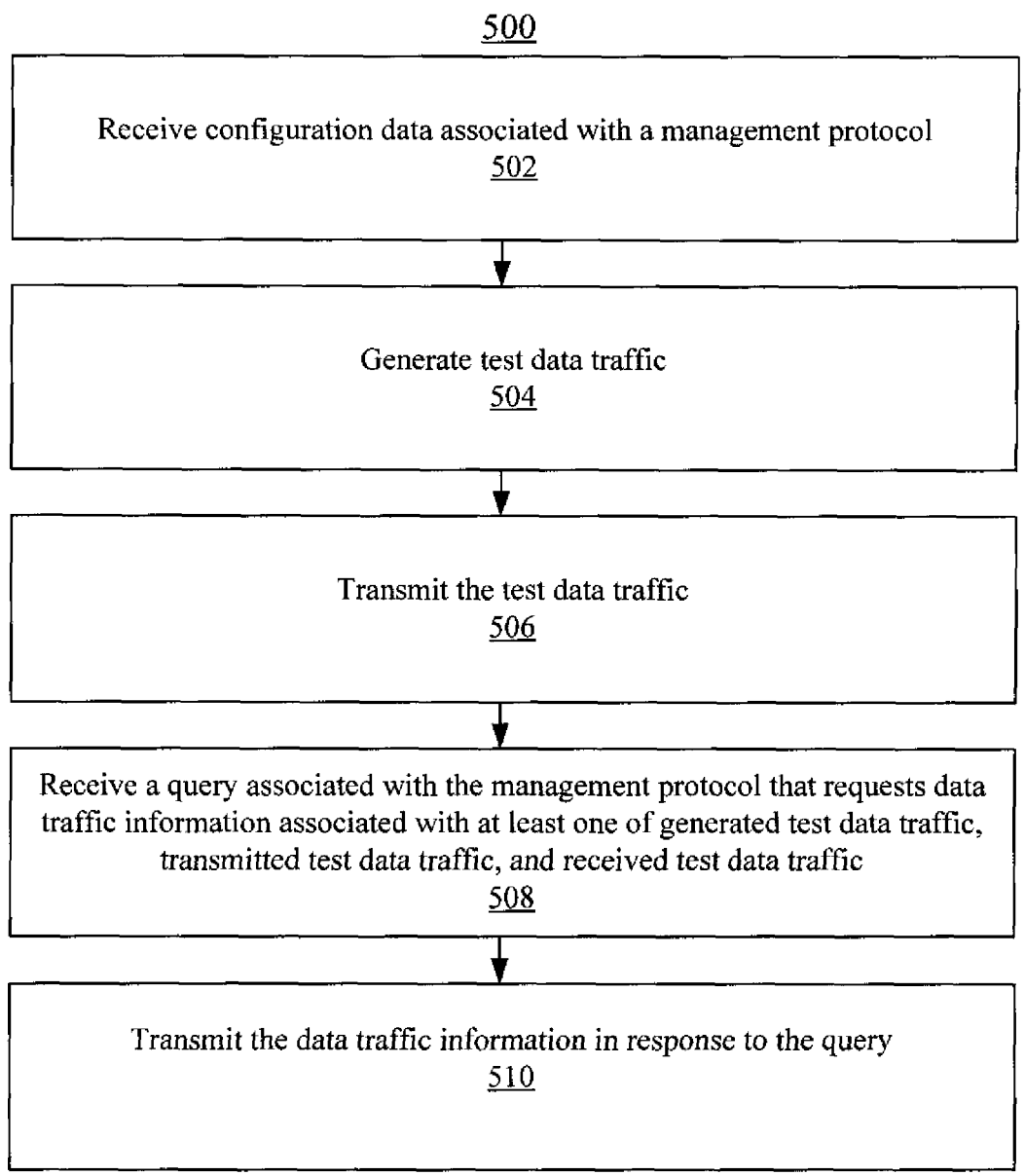
FIG. 5 illustrates flow chart of a method for testing network elements using a traffic generator with integrated SNMP capabilities.

FIG. 5 illustrates flow chart of a method for testing network elements using a traffic generator 102 with integrated SNMP capabilities. This exemplary method is provided by way of example, as there are a variety of ways to carry out methods disclosed herein. The method 500 shown in FIG. 5 can be executed or otherwise performed by one or a combination of various networks and/or network elements. The method 500 is described below as carried out by the traffic generator 102 of the network management system 100 shown in FIG. 1 by way of example, and various elements of the traffic generator 102 of the network management system 100 are referenced in explaining the example method of FIG. 5. Each block shown in FIG. 5 represents one or more processes, methods, or subroutines carried in the exemplary method 500. Referring to FIG. 5, the exemplary method 500 may begin at block 502.

In block 502, configuration data associated with a management protocol may be received. In an exemplary embodiment, the SNMP agent module 202 of the traffic generator 102 may receive configuration data associated with a management protocol from the management system 104. The method 500 may continue to block 504.

In block 504, test data traffic may be generated. In an exemplary embodiment, the traffic generator module 200 of the traffic generator 102 may generate test data traffic. The method 500 may continue to block 506.

In block 506, the test data traffic may be transmitted. In an exemplary embodiment, the traffic generator output module 206 of the traffic generator 102 may transmit the test data traffic to one or more network elements (e.g., the first network element 106, the second network element 108, the third network element 110, the traffic generator 102). The method 500 may continue to block 508.

In block 508, a query associated with the management protocol that requests data traffic information associated with at least one of generated test data traffic, transmitted test data traffic, and receive test data traffic may be received. In an exemplary embodiment, the SNMP agent module 202 of the traffic generator 102 may receive a query associated with the management protocol that requests data traffic information associated with at least one of generated test data traffic, transmitted test data traffic, and receive test data traffic from the management system 104. The method 500 may continue to block 510.

In block 510, data traffic information may be transmitted in response to the query. In an exemplary embodiment, the traffic generator output module 206 may transmit the data traffic information to the management system 104 in response to the query. The method 500 may then end.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

The invention claimed is:

1. A computer-implemented method comprising the steps of:
   receiving, at a traffic generator comprising a Simple Network Management Protocol (SNMP) agent, configuration data associated with a management protocol from a management system via a test network;
   generating, at the traffic generator, test data traffic at least based on the configuration data, wherein the test data traffic comprises fabricated data traffic configured to simulate real data traffic;
   transmitting, from the traffic generator, to a first network element, the test data traffic via the test network;
   transmitting, from the first network element, to one or more other network elements, the test data traffic via the test network;
   receiving, at the traffic generator, from the one or more other network elements, the test data traffic via the test network;
   receiving, at the traffic generator, from the management system, a query associated with the management protocol that requests data traffic information associated with at least one of the generated test data traffic, the transmitted test data traffic from the traffic generator, and the received test data traffic;
   processing the query by accessing values of distinct data traffic variables associated with the requested data traffic information, wherein the data traffic variables relate to a total number of data packets generated and a total number of data packets transmitted; and
   transmitting, to the management system, the requested data traffic information in response to the query.

2. The computer-implemented method of claim 1, wherein the management protocol comprises a Simple Network Management Protocol (SNMP).

3. The computer-implemented method of claim 1, further comprising applying the configuration data associated with the management protocol to one or more configuration variables to configure at least one of a test name, a system name, or a default route.

4. The computer-implemented method of claim 1, wherein the query further comprises a request for data traffic information that indicates a round trip travel time of the test data traffic from the traffic generator back to the traffic generator.

5. The computer-implemented method of claim 1, wherein the query further comprises a request for data traffic information that indicates an amount of error packets associated with the test data traffic.

6. The computer-implemented method of claim 1, further comprising analyzing at least one of the generated test data traffic, transmitted test data traffic from the traffic generator, and received test data traffic based on the query.

7. The computer-implemented method of claim 6, wherein analyzing further comprises analyzing at least one of the generated test data traffic, transmitted test data traffic from the traffic generator, and received test data traffic to formulate the data traffic information.

8. The computer-implemented method of claim 1, wherein the data traffic information comprises one or more data traffic statistics.

9. The computer-implemented method of claim 1, wherein the query is generated in accordance with the management protocol.

10. A system comprising:
    a SNMP agent computing apparatus configured to receive, at a traffic generator, configuration data associated with a management protocol from a management system via a test network;
    a traffic generator computing apparatus configured to generate, at the traffic generator, test data traffic at least based on the configuration data, wherein the test data traffic comprises fabricated data traffic configured to simulate real data traffic;
    a traffic generator output computing apparatus configured to transmit, to a first network element, the test data traffic via the test network;
    the SNMP agent computing apparatus configured to receive, at the traffic generator the test data traffic from a second network element via the test network;
    the SNMP agent computing apparatus configured to receive, at the traffic generator, from the management system, a query associated with the management protocol that requests data traffic information associated with at least one of the generated test data traffic, the transmitted test data traffic from the traffic generator, and the received test data traffic;
    the SNMP agent computing apparatus configured to process the query by accessing values of distinct data traffic variables associated with the requested data traffic information, wherein the data traffic variables relate to a total number of data packets generated and a the total number of data packets transmitted; and
    the traffic generator output computing apparatus configured to transmit, to the management system, the requested data traffic information in response to the query.

11. The system of claim 10, wherein the management protocol comprises a Simple Network Management Protocol (SNMP).

12. The system of claim 10, wherein the SNMP agent computing apparatus is further configured to apply the configuration data associated with the management protocol to one or more configuration variables to configure at least one of a test name, a system name, a default route.

13. The system of claim 10, wherein the query further comprises a request for data traffic information that indicates a round trip travel time of the test data traffic from the traffic generator output computing apparatus to the SNMP agent computing apparatus at the traffic generator.

14. The system of claim 10, wherein the query further comprises a request for data traffic information that indicates an amount of error packets associated with the test data traffic.

15. The system of claim 10, wherein the SNMP agent computing apparatus is further configured to analyze at least one of the generated test data traffic, the transmitted test data traffic from the traffic generator, and the received test data traffic.

16. The system of claim 10, wherein the SNMP agent computing apparatus is further configured to analyze by analyzing at least one of generated test data traffic, transmitted test data traffic from the traffic generator, and received test data traffic to formulate the data traffic information based on the query.

17. The system of claim 10, wherein data traffic information comprises one or more data traffic statistics.

18. The system of claim 10, wherein the query is generated in accordance with the management protocol.

19. A computer-implemented method comprising the steps of:

receiving, at a traffic generator comprising a Simple Network Management Protocol (SNMP) agent, configuration data associated with a management protocol from a management system via a test network;

applying the configuration data associated with the management protocol to one or more configuration variables to configure at least one of a test name, a response to a test, a system name, a default route;

generating, at the traffic generator, test data traffic at least based on the configuration data, wherein the test data traffic comprises fabricated data traffic configured to simulate real data traffic;

transmitting, to a first network element, the test data traffic via the test network;

receiving, at the traffic generator, from a second network element, the test data traffic via the test network;

receiving, at the traffic generator, from the management system, a query associated with the management protocol that requests data traffic information associated with at least one of the generated test data traffic, the transmitted test data traffic, and the received test data traffic;

processing the query by accessing values of distinct data traffic variables associated with the requested data traffic information, wherein the data traffic variables relate to a the total number of data packets generated and a total number of data packets transmitted; and transmitting, to the management system, the requested data traffic information in response to the query.

* * * * *